US012186264B2

(12) United States Patent
Ikeda et al.

(10) Patent No.: US 12,186,264 B2
(45) Date of Patent: Jan. 7, 2025

(54) RESIN CONTAINER AND RESIN CONTAINER CONNECTED BODY

(71) Applicant: Rohto Pharmaceutical Co., Ltd., Osaka (JP)

(72) Inventors: Naohiro Ikeda, Osaka (JP); Keita Kawai, Osaka (JP)

(73) Assignee: Rohto Pharmaceutical Co., Ltd., Osaka (JP)

( * ) Notice: Subject to any disclaimer, the term of this patent is extended or adjusted under 35 U.S.C. 154(b) by 301 days.

(21) Appl. No.: 17/770,302

(22) PCT Filed: Oct. 21, 2019

(86) PCT No.: PCT/JP2019/041317

§ 371 (c)(1),
(2) Date: Apr. 20, 2022

(87) PCT Pub. No.: WO2021/079405

PCT Pub. Date: Apr. 29, 2021

(65) Prior Publication Data

US 2022/0401300 A1 Dec. 22, 2022

(51) Int. Cl.
*A61J 1/06* (2006.01)
*B65D 1/09* (2006.01)

(52) U.S. Cl.
CPC .............. *A61J 1/067* (2013.01); *B65D 1/095* (2013.01)

(58) Field of Classification Search
CPC ................................. A61J 1/067; B65D 1/095
See application file for complete search history.

(56) References Cited

U.S. PATENT DOCUMENTS

| | | | | |
|---|---|---|---|---|
| 11,167,889 B2 | 11/2021 | Ikeda et al. | | |
| 2006/0108384 A1 | 5/2006 | Zahn et al. | | |
| 2006/0229583 A1* | 10/2006 | Nagao | A61J 1/067 | 604/294 |
| 2007/0138215 A1* | 6/2007 | Zahn | B65D 1/095 | 222/541.9 |
| 2013/0087471 A1* | 4/2013 | Huber-Haag | B65D 77/08 | 53/436 |
| 2013/0165851 A1* | 6/2013 | Geiger | A61J 1/067 | 604/68 |
| 2023/0094229 A1* | 3/2023 | Koshiro | A61J 1/067 | 222/107 |

FOREIGN PATENT DOCUMENTS

| | | |
|---|---|---|
| CN | 104136019 A | 11/2014 |
| CN | 105612208 A | 5/2016 |

(Continued)

OTHER PUBLICATIONS

International Search Report issued in corresponding International Patent Application No. PCT/JP2019/041317 dated Dec. 10, 2019.

(Continued)

*Primary Examiner* — J C Jacyna
(74) *Attorney, Agent, or Firm* — Morgan, Lewis & Bockius LLP

(57) ABSTRACT

The present invention is a resin container in which an inner wall surface of a container body includes a cyclic olefin copolymer, and a diameter upstream of an outlet of the container body ranges from 0.5 mm to 8.0 mm.

8 Claims, 9 Drawing Sheets

(56) References Cited

FOREIGN PATENT DOCUMENTS

| | | | | |
|---|---|---|---|---|
| JP | 2000-042087 A | 2/2000 | | |
| JP | 2000-238847 A | 9/2000 | | |
| JP | 2008-104868 A | 5/2008 | | |
| JP | 2012-135621 A | 7/2012 | | |
| JP | 2015-123993 A | 7/2015 | | |
| TW | 201841597 A | 12/2018 | | |
| WO | 2009/113177 A1 | 9/2009 | | |
| WO | 2017/115752 A1 | 7/2017 | | |
| WO | 2018/190422 A1 | 10/2018 | | |
| WO | WO2018190422 * | 10/2018 | .............. | A61J 1/067 |

OTHER PUBLICATIONS

International Preliminary Report on Patentability and Written Opinion issued in corresponding International Patent Application No. PCT/JP2019/041317 dated May 5, 2022.

Extended European Search Report issued in counterpart European Patent Application No. 19950176.8 dated Jul. 3, 2023.

* cited by examiner

RESIN CONTAINER AND RESIN CONTAINER CONNECTED BODY

TECHNICAL FIELD

The present invention relates to a resin container. More specifically, the present invention relates to a resin container provided with a container body made of resin and configured to store liquid content and a resin container connected body provided with a connected body having a configuration in which a plurality of the resin containers are connected together.

BACKGROUND ART

Various types of known resin containers are widely used for storing liquid content.

An example of a resin container of this type is a known resin container (see Patent Document 1 below) provided with a body portion that stores liquid content, a neck portion having a small diameter and being continuous with the body portion, and an outlet provided on an end of the neck portion for expelling the liquid content.

CITATION LIST

Patent Literature

Patent Document 1: JP 2000-238847 A

SUMMARY OF INVENTION

Technical Problem

With the resin container configured such that liquid content is expelled via the neck portion having a smaller diameter than the body portion, the liquid content may enter the neck portion during storage and collect there, and not move down from the neck portion even when the outlet is pointed upward.

When the resin container in this state is opened, the collected liquid content may fly out from the container at the time of opening.

Thus, to solve such a problem, the present invention is directed at providing a resin container that suppresses liquid collection and a resin container connected body provided with a connected body having a configuration in which a plurality of the resin containers are connected together.

Solution to Problem

To solve such problems, the present invention provides a resin container including a container body made of resin, configured to store liquid content, and including an outlet. The container body includes a body portion configured to store the liquid content, the outlet of the container body has a smaller diameter than the body portion, an inner wall surface of the container body that comes into contact with the liquid content includes a cyclic olefin copolymer, and at least a portion of a flow path of the liquid content upstream of the outlet has a diameter ranging from 0.5 mm to 8.0 mm.

DESCRIPTION OF EMBODIMENTS

Hereinafter, embodiments of a resin container of the present invention will be described with reference to the drawings.

A connected body including a plurality of connected resin containers is used as an example of an embodiment of the present invention in the following description.

Figure 1:
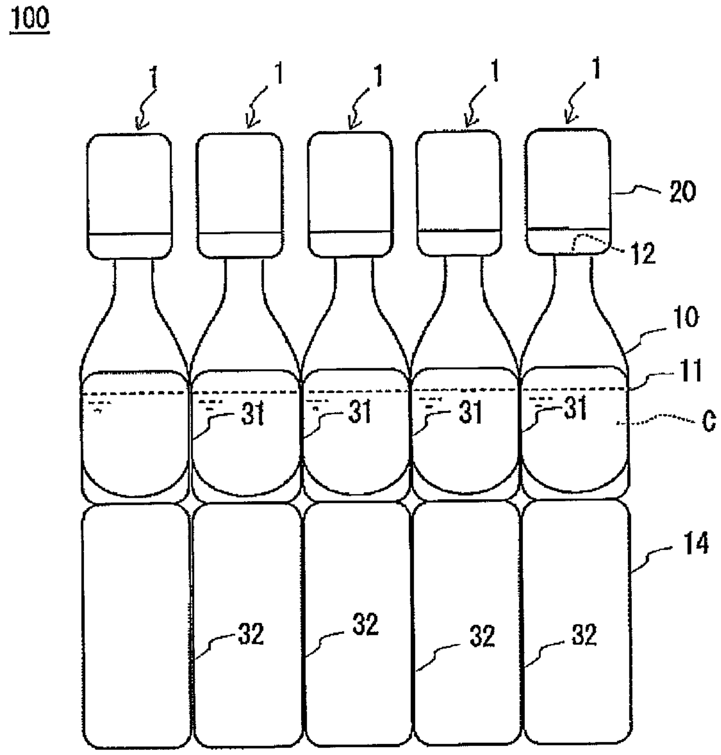
FIG. 1 is a front view illustrating a connected body including a plurality of connected resin containers that are each provided with a container body and a lid.

FIG. 1 is a diagram illustrating a connected body 100 formed of five connected resin containers 1.

As also illustrated in this diagram, the resin container 1 of the present embodiment is provided with a container body 10 including a storage portion 11 configured to store liquid content C and an outlet 12 for the liquid content C.

As illustrated in FIGS. 1 to 5, the resin container 1 according to the present embodiment is further provided with a lid 20 made of resin. The lid 20 seals the container body 10 by blocking the outlet 12 of the container body 10.

The resin container 1 according to the present embodiment is an integrally formed article including the lid 20 and the container body 10 and is configured such that the outlet 12 appears when the lid 20 is broken off from the container body 10.

That is, the resin container 1 according to the present embodiment can be opened by breaking the resin container 1 between the lid 20 and the container body 10 and detaching the lid 20 from the container body 10.

In the present embodiment, the connected body 100 is formed of the plurality of resin containers 1, each provided with the container body 10 and the lid 20, connected together.

In the connected body 100 of the present embodiment, the plurality of container bodies 10 are disposed side by side in a row with an opening direction of the outlets 12 facing upward, and the connected body 100 includes a connecting portion disposed between two adjacent resin containers 1 in the side by side direction, the connecting portions connecting the adjacent resin containers 1.

In other words, in the connected body 100, the plurality of resin containers 1 are connected via the connecting portions provided on the side edge portions of each resin container 1.

The connecting portions may connect the adjacent container bodies 10 via a point connection or via a linear connection. Alternatively, the connecting portions may connect the adjacent lids 20 via a point connection or via a linear connection.

In other words, the connection state of the connecting portions is not particularly limited.

In the connected body 100 exemplified in the present embodiment, the container bodies 10 are connected via connecting portions 31 and 32 that extend vertically along the side edge portions of the container bodies 10.

In the present embodiment, each resin container 1 provided with the container body 10 and the lid 20 is an integrally formed article, and the connected body 100 is also an integrally formed article. Thus, the plurality of resin containers 1 can be separated one by one by breaking the connecting portions 31 and 32.

The container body 10 of the present embodiment is not particularly limited in terms of the internal volume of the container body 10 when sealed with the lid 20. However, the internal volume may be 10 mL or less at room temperature (for example, 23° C.) and at normal pressure (for example, 1.0 atm), for example.

The internal volume in the present embodiment may be 8 mL or less, 6 mL or less, or 4 mL or less.

The internal volume may be 0.1 mL or greater or 0.2 mL or greater.

The internal volume may be 0.3 mL or greater or 0.4 mL or greater.

The volume of the container body 10 more preferably ranges from 0.1 mL to 10 mL.

In a case where some of the liquid content C leaks due to liquid collection when a resin container with a small capacity is opened, the proportion of the lost liquid content C with respect to the overall amount is large even if only a small absolute amount is lost.

Thus, in order for the effect of the present invention to be more pronounced, the resin container 1 preferably has a volume such as that described above.

The storage portion 11 of the container body 10 according to the present embodiment is cylindrical with a closed bottom.

Specifically, the container body 10 according to the present embodiment includes a body portion 10*a* having a cylindrical shape, a shoulder portion 10*b* that is continuous with the upper end of the body portion 10*a*, and a neck portion 10*c* that is continuous with the upper end of the shoulder portion 10*b*. The container body 10 is configured such that the outlet 12 opens upward at the upper end surface of the neck portion 10*c*.

The body portion 10*a* has a cylindrical shape with a substantially constant cross-sectional shape (inner diameter) when sectioned along the horizontal plane.

The shoulder portion 10*b* is formed to have a cross-sectional shape (inner diameter) that has an increasingly smaller diameter toward the top when sectioned along the horizontal plane.

The container body 10 of the present embodiment includes the neck portion 10*c* that has a cylindrical shape with a smaller diameter than the body portion 10*a* and extends upward from the upper end of the shoulder portion 10*b*.

The liquid content C of the resin container 1 of the present embodiment can be expelled by tipping the container body 10 with the lid 20 removed and in an open state upside down so that the outlet 12 is pointing downward, and squeezing the storage portion 11 with fingertips from front to back to apply pressure to the storage portion 11 and discharge the liquid content C via the outlet 12.

The resin container 1 exemplified in the present embodiment is a drop-dispensing container configured to dispense drops of the liquid content C from the outlet 12 when the container is in an open state.

Since the container body 10 of the present embodiment includes the neck portion 10*c*, all of the liquid content C is less likely to drop out through the outlet 12 due to its own weight when the container body 10 is turned upside down.

Also, the container body 10 of the present embodiment is flexible due to the excellent flexibility of the storage portion 11. This allows the amount of the liquid content C dispensed from the outlet 12 to be easily adjusted by adjusting the applied pressure or the like.

The neck portion 10*c* according to the present embodiment forms a flow path for the liquid content C at an upstream side of the outlet 12 when the liquid content C stored in the body portion 10*a* is discharged to the outside through the outlet 12.

From the perspective of mitigating the problem that the liquid content C unintentionally enters the neck portion 10*c* and collects there, the neck portion 10*c* is preferably formed with an inner diameter (diameter of the flow path of the liquid content C) ranging from 0.5 mm to 8.0 mm.

The inner diameter is more preferably 0.7 mm or greater, even more preferably 0.9 mm or greater, and particularly preferably 1.0 mm or greater.

The inner diameter may be 7.5 mm or less, 7.0 mm or less, 6.5 mm or less, 6.0 mm or less, 5.5 mm or less, 5.0 mm or less, 4.5 mm or less, 4.0 mm or less, 3.5 mm or less, or 3.0 mm or less, preferably 2.8 mm or less, more preferably 2.5 mm or less, even more preferably 2.0 mm or less, particularly preferably 1.8 mm or less.

The resin container 1 exemplified in the present embodiment includes the neck portion 10*c* as described above. However, at least one portion of the flow path for the liquid content C at an upstream side of the outlet 12 preferably has the diameter described above, and this is also the case for a resin container 1*x* without a neck portion, as illustrated in FIG. 6.

Figure 5:
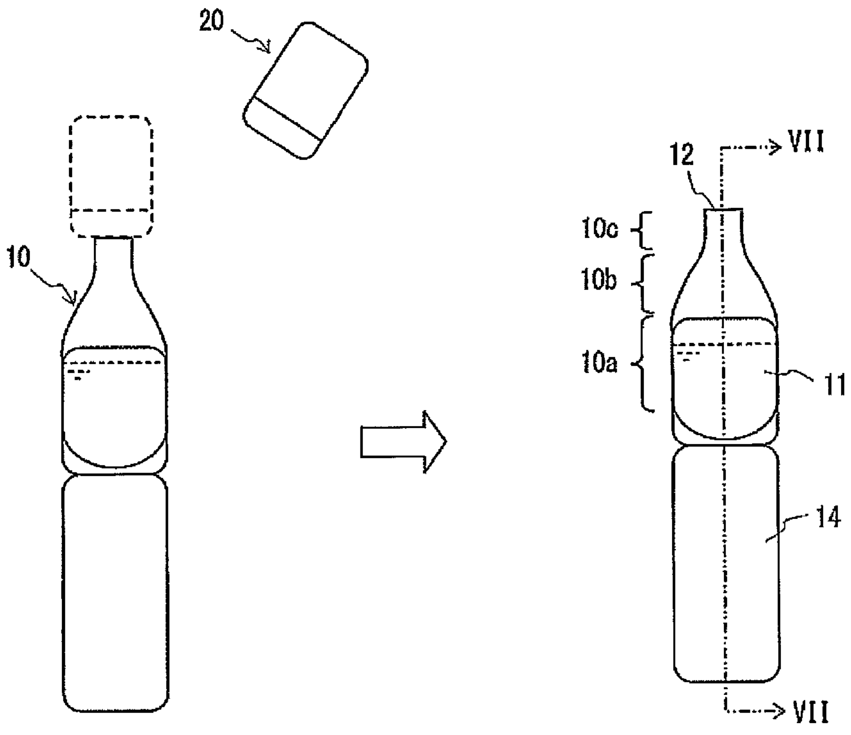
FIG. 5 is a front view illustrating the resin container being opened.
Figure 6:
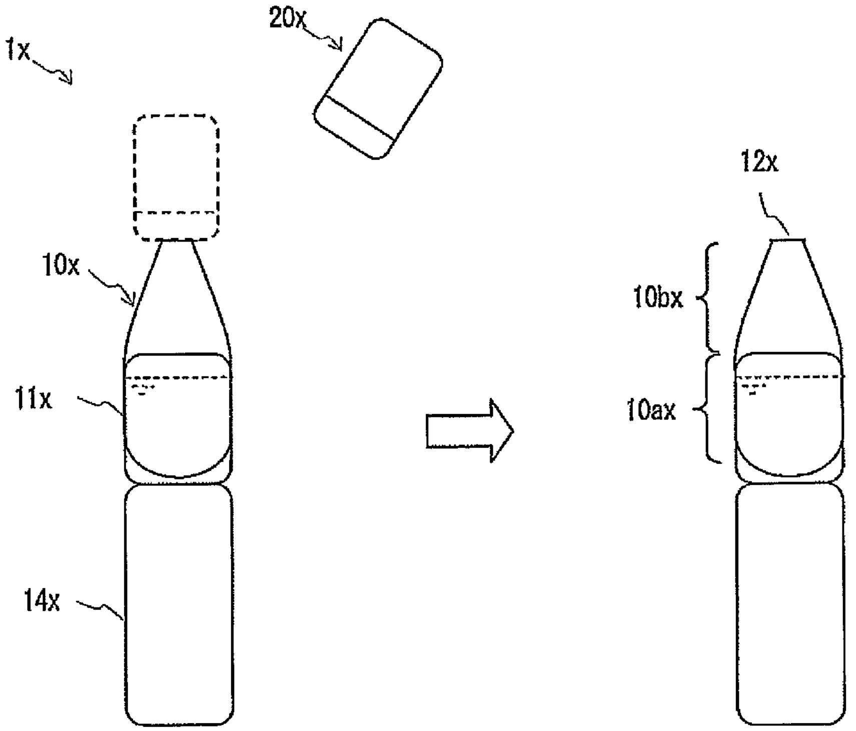
FIG. 6 is a front view illustrating a resin container according to another embodiment being opened.

The resin container 1*x* illustrated in FIG. 6 is the same as the resin container 1 illustrated in FIGS. 1 to 5 in that a container body 10*x* including an outlet 12*x* and a lid 20*x* that blocks the outlet 12*x* to seal the container body are provided and that the container body 10*x* includes a holding portion 14*x* to be described below.

However, the resin container 1*x* illustrated in FIG. 6 is different from the resin container 1 illustrated in FIGS. 1 to 5 in that the outlet 12*x* at the upper end of a shoulder portion 10*bx* continuous with an upper portion of a body portion 10*ax* is open.

Despite this, the resin container 1*x* illustrated in FIG. 6 is the same as the resin container 1 illustrated in FIGS. 1 to 5 in that liquid collection is suppressed because the upstream portion in the flow direction of the liquid content C when the liquid content C is extracted from the outlet 12 has a predetermined diameter.

Specifically, the resin container 1*x* illustrated in FIG. 6 is the same as the resin container 1 illustrated in FIGS. 1 to 5 in that, at the upper end portion of the shoulder portion 10*bx* corresponding to the flow path of the liquid content C upstream of the outlet 12, the inner diameter until the outlet 12 is set in the range described above (for example, ranging from 0.5 mm to 8.0 mm). This allows liquid collection to be suppressed.

In regard to liquid collection, an inner lateral cross-sectional area ($S_0$) of the body portion 10*a* and a lateral cross-sectional area ($S_1$) of the flow path at the portion having the diameter described above are preferably each a predetermined size.

The inner lateral cross-sectional area ($S_0$) (the area of the portion inward from the inner wall surface in a cross-section taken along the horizontal plane) of the body portion 10*a* is preferably 20 $mm^2$ or greater, more preferably 25 $mm^2$ or greater, and particularly preferably 30 $mm^2$ or greater.

The inner lateral cross-sectional area ($S_0$) may be 300 $mm^2$ or less, 260 $mm^2$ or less, 220 $mm^2$ or less, or 180 $mm^2$ or less, more preferably 140 $mm^2$ or less, even more preferably 120 $mm^2$ or less, and particularly preferably 100 $mm^2$ or less.

The ratio ($S_0/S_1$) between the inner lateral cross-sectional area ($S_0$) of the body portion 10*a* and the lateral cross-sectional area ($S_1$) of the flow path is preferably 1.5 or greater, more preferably 2 or greater, even more preferably 5 or greater, and particularly preferably 10 or greater.

The ratio ($S_0/S_1$) is preferably 60 or less, more preferably 50 or less, even more preferably 40 or less, and particularly preferably 30 or less.

The body portion 10*a* of the present embodiment is not required to have a cylindrical shape as described above.

In this case, a section having the largest diameter corresponding to the portion of the body portion that is compressed by fingertips when the liquid content is discharged preferably has the inner lateral cross-sectional area ($S_0$) described above, and the central portion in the height direction is preferably formed with the inner lateral cross-sectional area ($S_0$) described above.

Typically, the inner diameter (diameter of the flow path) of the neck portion 10*c* can be determined by determining the cross-sectional area of a shape defined by the inner surface of the neck portion 10*c* when the neck portion 10*c* is sectioned along a plane orthogonal to the flow direction of the liquid content C and taking the diameter of a circle having the same area as the cross-sectional area.

The inner diameter can be determined in a similar manner for the resin container 1*x* illustrated in FIG. 6, and instead of the cross-sectional area of the neck portion, the diameter of the flow path may be determined by determining the cross-sectional area of the upper end portion of the shoulder portion 10*bx*.

The neck portion 10*c* is preferably provided with a portion that has a preferable inner diameter as described above with a length ranging from 0.5 mm to 12 mm.

The length is more preferably 0.7 mm or greater and even more preferably 0.9 mm or greater.

The length is more preferably 10 mm or less and even more preferably 8 mm or less.

The container body 10 of the present embodiment further includes a holding portion 14 having a hollow rectangular plate-like shape and extending downward from the lower end of the storage portion 11.

More specifically, in the container body 10 of the present embodiment, storage space having a bottle shape as described above is provided above the hollow plate-like holding portion 14 having a long rectangular shape in a front view.

Note that in the container body 10 of the present embodiment, only the bottle-shaped portion is the portion that can store the liquid content C, and the hollow portion of the holding portion 14 is a space that is isolated from and not connected to the internal space of the storage portion 11.

Here, the internal volume of the container body 10 refers to the volume of the portion that can store the liquid content C and does not include the volume of the hollow portion of the holding portion 14.

As described above, because the rectangular plate-like holding portion 14 is provided in the present embodiment, information such as the product name and expiration date can be displayed on the holding portion 14.

Note that in a case where a larger volume of the storage portion 11 is preferable, the holding portion 14 may be made smaller or removed, as necessary.

In the connected body 100 according to the present embodiment, adjacent resin containers 1 are connected so that five resin containers 1 are connected via a first connecting portion 31 that connects the side edges of the body portion 10*a* so that the connection region extends linearly and vertically and a second connecting portion 32 that connects the side edges of the holding portions 14 so that the connection region extends linearly and vertically.

The connected body 100 according to the present embodiment is a molded article manufactured by a blow-fill-seal method as described below.

Accordingly, the resin container 1 according to the present embodiment can suppress foreign matter contamination when the liquid content C is stored in the storage portion 11.

Also, the resin container 1 according to the present embodiment is used as a unit dose container containing a small amount of the liquid content C as described above.

Figure 2:
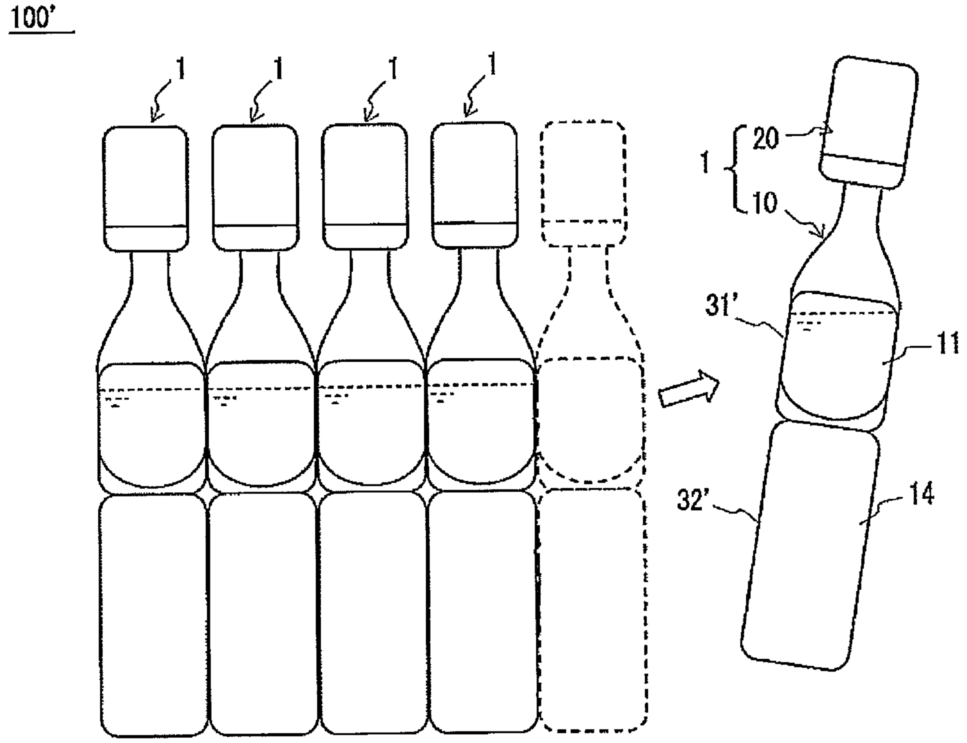
FIG. 2 is a front view illustrating one of the resin containers provided with the container body and the lid being separated from the connected body.
Figure 3:
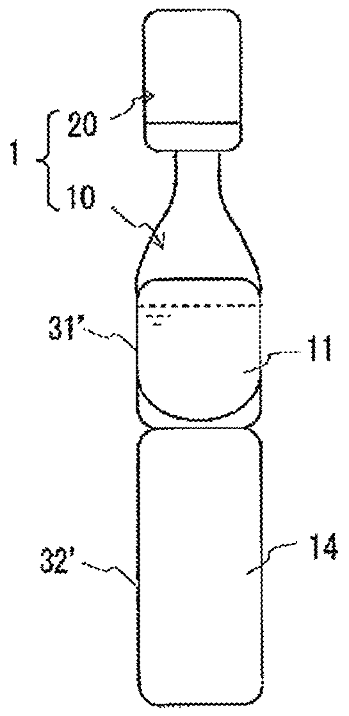
FIG. 3 is a front view illustrating one of the resin containers separated from the connected body.
Figure 4:
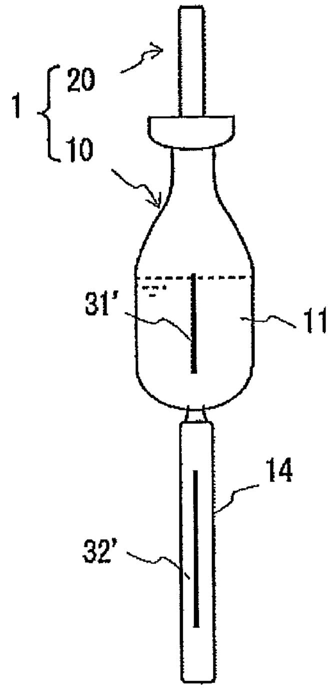
FIG. 4 is a side view illustrating one of the resin containers separated from the connected body.

As illustrated in FIG. 2, the process for expelling the liquid content C from the resin container 1 includes, first, breaking the connecting portions of the connected body 100 at the first connecting portion 31 and the second connecting portion 32, removing a single resin container 1 from the connected body 100, and then, as illustrated in FIG. 5, removing the lid 20 from the resin container 1 removed from the connected body 100 to place the container body 10 in an open state.

The connected body 100 of the present embodiment is configured such that the connecting portions 31 and 32 can be broken without using a tool, such as scissors or a utility knife, and can be broken with just hand strength by applying force to pull apart adjacent resin containers 1.

Furthermore, the container body 10 and the lid 20 of the resin container 1 of the present embodiment can be broken apart by tearing with the hand without using a tool.

Conventionally, in a case where a single resin container is broken off from a connected body, blade-teeth-like ridges and grooves tend to form on the connecting portions 31' and 32' after breakage, or burrs tend to form on the peripheral edge portion of the outlet after breakage.

The ridges and grooves at the connecting portions 31' and 32' after breakage may negatively affect the tactile sensation when the resin container is held.

Also, burrs at the peripheral edge portion of the outlet may prevent the drops of the liquid content from being dispensed by normally dropping due to gravity.

However, in the present embodiment, the problems described above can be suppressed by configuring the resin container 1 of a specific material.

Figure 7:
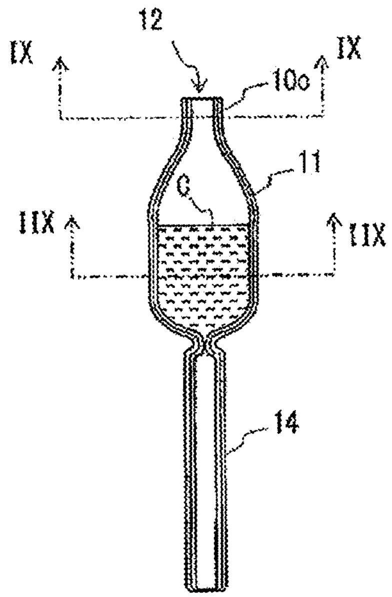
FIG. 7 is a cross-sectional view illustrating a cross-section taken along line VII-VII in FIG. 5.
Figure 8:
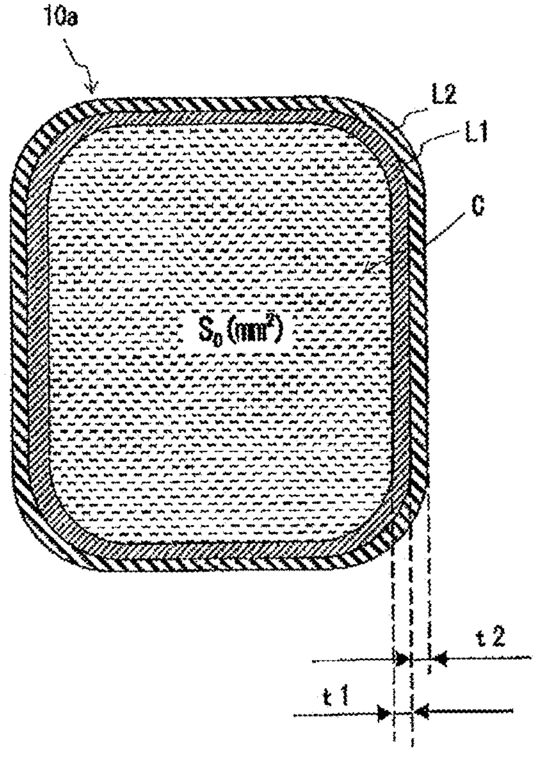
FIG. 8 is an enlarged cross-sectional view illustrating a cross-section (body portion lateral cross-section) taken along line IIX-IIX in FIG. 7.
Figure 9:
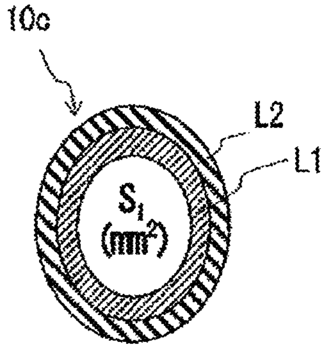
FIG. 9 is an enlarged cross-sectional view illustrating a cross-section (neck portion lateral cross-section) taken along line IX-IX in FIG. 7.

As illustrated in FIGS. 7, 8, 9 and other figures, in the present embodiment, the container body 10 has a multilayer structure including a first layer L1 being an innermost layer that comes into contact with the liquid content C, and a second layer L2 that is in contact with the first layer L1 from an outer side of the first layer L1. The first layer L1 contains a cyclic olefin copolymer (COC) and a linear low-density polyethylene (PE-LLD) resin, and the second layer contains a low-density polyethylene (PE-LD) resin.

In the container body 10 storing the liquid content C, because the first layer L1 forming the inner wall surface contains the cyclic olefin copolymer (COC), appropriate wettability with respect to the liquid content C can be achieved.

Due to this and the neck portion 10*c* having an appropriate inner diameter, according to the present embodiment, liquid collecting in the neck portion 10*c* is suppressed.

In the present embodiment, the second layer that is in contact with the first layer L1 from an outer side of the first layer L1 is provided. Thus, with the second layer L2, the total thickness of the container body 10 can be kept at a constant value or increased even if the thickness of the first layer L1 is reduced.

Accordingly, in the present embodiment, a container thickness that can suppress leakage from the container body 10 caused by a pin hole or the like can be ensured.

In the present embodiment, the second layer L2 contains PE-LD and thus can impart flexibility to the container body 10.

Furthermore, in the present embodiment, because the first layer L1 contains both COC and PE-LLD, the affinity between the first layer L1 and the second layer L2 is greater than in a case where PE-LLD is not contained.

Thus, when the first layer L1 and the second layer L2 are thermally fused together and the layers are integrally formed, excellent adhesiveness is exhibited between the layers, which can suppress inter-layer peeling.

Generally it is known that, when a polyethylene resin sheet is torn, thread-like burrs (projections) tend to form on the broken surface. In a case where the resin container 1 of the present embodiment is formed of only polyethylene resin, burrs may form at the sections corresponding to connecting portions 31' and 32' and the peripheral edge portion of the outlet 12 after breakage.

However, in the present embodiment, the container body 10 has a two layer structure in which the resin described above is used. Thus, the height of the formed saw-like ridges and grooves at the connecting portions 31' and 32' after breakage and the burrs formed on the peripheral edge portion of the outlet 12 can be suppressed to a low height.

For the PE-LLD contained in the first layer L1, a typical PE-LLD can be used with ethylene as the main monomer and an α-olefin having 4 or more carbon atoms (for example, 1-butene, 1-hexene, 1-octene, 4-methylpentene-1, or the like) as the comonomer.

The PE-LLD preferably contains 1-hexene or 1-octene as the comonomer, and more preferably contains 1-hexene as the comonomer from the perspective of obtaining the effect of the present invention to a significant degree.

With the PE-LLD, preferably, the comonomer introduces a short chain branch in the molecular structure, the degree of crystallinity is reduced, and low density is achieved.

The short chain branch is preferably introduced at a ratio of from 5 to 100 per 1000 units of structural units of ethylene and is more preferably introduced at a ratio of from 10 to 50.

In other words, the proportion of the comonomer with respect to the total amount of ethylene and the comonomer in the PE-LLD preferably ranges from 0.5 mol % to 10 mol % and more preferably ranges from 1 mol % to 5 mol %.

Also, the PE-LLD preferably has a density of 910 $kg/m^3$ or greater and more preferably has a density of 915 $kg/m^3$ or greater.

The density of the PE-LLD is preferably 930 $kg/m^3$ or less.

The melt mass flow rate (MFR) of the PE-LLD is preferably 0.5 g/10 min or greater and more preferably 0.6 g/10 min or greater.

The melt mass flow rate is preferably 5.0 g/10 min or less, more preferably 4.0 g/10 min or less, and even more preferably 3.0 g/10 min or less.

The melt mass flow rate of the PE-LLD and the PE-LD can be determined using method A (mass measuring method) according to JIS K7210:2014 "Plastics—Determination of the Melt Mass-flow Rate (MFR) and Melt Volume-flow Rate (MVR) of Thermoplastics—Part 1: Standard method" and can be determined under the conditions of a temperature of 190° C. and a certified load of 2.16 kg.

Similarly, the melt mass flow rate of the COC can be determined under the conditions of a temperature of 260° C. and a certified load of 2.16 kg.

The PE-LLD may be a polymerization product using a multi-site catalyst such as a Ziegler-Natta catalyst or may be a polymerization product using a single-site catalyst such as a metallocene catalyst.

The first layer L1 of the present embodiment contains only one type of PE-LLD, but may contain two or more types of PE-LLD.

The COC contained in the first layer L1 along with the PE-LLD as described above is obtained by addition copolymerization of one type or two or more types of a norbornene-based monomer and ethylene using a known method or by hydrogenation of these monomers via a standard method, and specifically has the structure represented by General Formula (1) below.

[Chemical Formula 1]

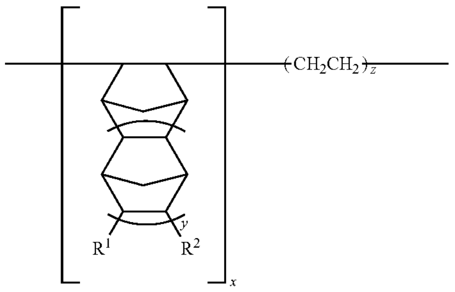

(1)

(where $R^1$ and $R^2$ in Formula (1) are the same or different and represent hydrogen, hydrocarbon residue, or a polar group of halogen, ester, nitrile, or pyridyl. $R^1$ and $R^2$ may be bonded to one another to form a ring. x and z are integers of 1 or greater, and y is an integer of 0 or 1 or greater.)

The COC preferably has a glass transition temperature (Tg) of 60° C. or higher, more preferably 63° C. or higher, even more preferably 65° C. or higher, and yet even more preferably 67° C. or higher. The glass transition temperature (Tg) is preferably 130° C. or lower, more preferably 120° C. or lower, even more preferably 110° C. or lower, yet even more preferably 100° C. or lower, and particularly preferably 90° C. or lower.

Also, in the present specification, "glass transition temperature (Tg)" refers to the midpoint glass transition temperature identified by measuring under the conditions of a rate of temperature increase of 10° C./min in accordance with JIS K7121, unless otherwise indicated.

In a case where two or more types of COC are used, the Tg of the COC is identified in terms of a weighted average of each cyclic olefin resin.

From the perspective of the moldability of the resin container 1, the proportion of structural units derived from a norbornene-based monomer in the COC is preferably 70 mass % or less.

The proportion is more preferably 68 mass % or less, even more preferably 66 mass % or less, and particularly preferably 64 mass % or less.

The proportion is preferably 15 mass % or greater, more preferably 18 mass % or greater, even more preferably 20 mass % or greater, and particularly preferably 22 mass % or greater.

Specific examples of polymers with structural units represented by the above-described General Formula (1) include trade name Apel (trademark) available from Mitsui Chemicals, Inc., and trade name TOPAS (trademark) available from Advanced Polymers GmbH.

From the perspective of the moldability and the mechanical properties and the like of the molded product, the COC preferably has a melt flow rate (MFR (260° C., 2.16 kg)) ranging from 10 g/10 min to 40 g/10 min.

The COC and the PE-LLD are preferably blended so that, when the glass transition temperature of the first layer L1 is measured, the glass transition temperature ranges from 60° C. to 130° C. The glass transition temperature (Tg) is preferably 60° C. or higher, more preferably 63° C. or higher, even more preferably 65° C. or higher, and yet even more preferably 67° C. or higher. The glass transition temperature (Tg) is preferably 130° C. or lower, more preferably 120° C. or lower, even more preferably 110° C. or lower, yet even more preferably 100° C. or lower, and particularly preferably 90° C. or lower.

The amount of the COC contained in the first layer is preferably greater than 50 mass %, more preferably 55 mass % or greater, and particularly preferably 60 mass % or greater.

The amount of the COC contained in the first layer is preferably 95 mass % or less, more preferably 90 mass % or less, and particularly preferably 85 mass % or less.

The first layer of the present embodiment contains more of the COC than the PE-LLD.

The proportion of the COC shown by the total amount of COC and PE-LLD contained in the first layer L1 is preferably greater than 50 mass %, more preferably 55 mass % or greater, and particularly preferably 60 mass % or greater.

The proportion is preferably 95 mass % or less, more preferably 90 mass % or less, and particularly preferably 85 mass % or less.

In other words, the proportion of the PE-LLD with respect to the total amount of COC and PE-LLD in the first layer L1 preferably ranges from 5 mass % to less than 50 mass %.

The resin container 1 of the present embodiment is formed via blow molding, and more specifically, is formed via a blow-fill-seal method.

Thus, for example, the resin container 1 can be manufactured using a method including blowing air into a high-temperature parison with the second layer L2 formed on the outer side such that the parison pressed, from the inside, outward comes into contact with the mold.

Note that the first layer L1 may contain, in addition to the COC and the PE-LLD, an additive component (a rubber or plastic chemical, a filling agent such as a filler, an antioxidant, other resins, and the like), but the contained amount is preferably 5 mass % or less, more preferably 3 mass % or less, and even more preferably 1 mass % or less.

It is particularly preferable that the first layer L1 contains essentially only the COC and the PE-LLD.

The second layer L2 that is in contact with the first layer L1 from an outer side of the first layer L1 and forms the container body 10 together with the first layer L1 includes a PE-LD.

The PE-LD forming the second layer L2 preferably has a density ranging from 910 kg/$m^3$ to 930 kg/$m^3$ and preferably has a density ranging from 915 kg/$m^3$ to 925 kg/$m^3$.

As described above, the PE-LD preferably has a bulky molecular structure and includes many molecular chain entanglements.

Specifically, the PE-LD forming the second layer L2 is preferably a polymerized material obtained via high pressure polymerization with long chain branches present in the molecular structure.

The MFR (190° C., 2.16 kg) of the PE-LD is preferably 1.5 g/10 min or less, more preferably 1.3 g/10 min or less, even more preferably 1.1 g/10 min or less, and particularly preferably 1.0 g/10 min or less.

The MFR of the PE-LD is preferably 0.1 g/10 min or greater, more preferably 0.2 g/10 min or greater, and even more preferably 0.3 g/10 min or greater.

Note that the second layer L2 may contain in small amounts, in addition to the PE-LD, an additive component (a rubber or plastic chemical, a filling agent such as a filler, an antioxidant, a coloring agent, other resins, and the like), but the contained amount is preferably 5 mass % or less, more preferably 3 mass % or less, and even more preferably 1 mass % or less.

It is particularly preferable that the second layer L2 contains essentially only the PE-LD.

The thickness of the first layer L1 and the thickness of the second layer L2 varies depending on the applications of the resin container 1, but in the case of a small container with a capacity for the liquid content C in the storage portion 11 of 10 mL or less as described in the present embodiment, the total combined thickness is preferably set ranging from 0.15 mm to 1 mm.

Note that from the perspective of increasing the internal pressure inside the container to assist in removing the liquid content C from the outlet 12, the storage portion 11 is preferably thin and easy to deform. However, the storage portion 11 preferably also has a certain thickness or greater to help prevent the storage portion 11 from breaking.

The total thickness (t1+t2) of the thickness (t1) of the first layer L1 and the thickness (t2) of the second layer L2 is preferably 0.2 mm or greater, more preferably 0.24 mm or greater, and even more preferably 0.28 mm or greater, at least at the section of the storage portion 11 configured as the storage space of the liquid content C.

The total thickness (t1+t2) is preferably 0.8 mm or less, more preferably 0.7 mm or less, and even more preferably 0.6 mm or less.

The thickness (t1) of the first layer L1 preferably ranges from 0.05 mm to 0.4 mm, more preferably ranges from 0.1 mm to 0.35 mm, and even more preferably ranges from 0.15 mm to 0.30 mm.

The thickness (t2) of the second layer L2 preferably ranges from 0.1 mm to 0.6 mm, more preferably ranges from 0.1 mm to 0.55 mm, and even more preferably ranges from 0.15 mm to 0.5 mm.

The liquid content C stored in the storage portion 11 is not particularly limited as long as it has fluidity, and examples thereof include food or drink products (beverages, seasoning, oral medication, nutritional supplements, and the like), external use products (skin care agents, hair care agents, cosmetics and eye drops such as makeup cosmetics, ophthalmic compositions such as contact lens agents, nasal drops, disinfectants; gargles, repellents, and the like), and functional chemicals (detergents, softeners, fragrances, deodorizers, adhesives, and the like).

Among these examples of the liquid content C, the ophthalmic compositions are suitably used as the liquid content C stored in the resin container 1 of the present embodiment for the reason that there is a demand for dispensing an appropriate amount of the liquid content C as drops.

Examples of ophthalmic compositions that can be stored in the resin container 1 include eye drops, eye drops for contact lenses, artificial tears, eyewash agents (i.e., eye washing liquids or eye washing agents), contact lens application agents, and contact lens care products (disinfectants, storing agents, cleaning agents, and the like).

The resin container 1 of the present embodiment may be manufactured via the blow-fill-seal method in which the resin container 1 is filled with the liquid content C as described above when the resin container 1 is manufactured.

The specific example described below is an example of how the resin container (connected body) of the present embodiment may be manufactured.

(1) Blow Process

A parison having a two layer structure is manufactured via extrusion with a melt-kneaded article obtained by melt-kneading the raw material (cyclic olefin copolymer (COC) and linear low-density polyethylene (PE-LLD) resin) for forming the first layer on the inner side and a melt-kneaded article obtained by melt-kneading the raw material (low-density polyethylene (PE-LD)) for forming the second layer on the outer side. Subsequently, the parison is sandwiched by a split mold formed so as to have a cavity corresponding to the shape of the connected body when the split mold is closed, air is forced inside the parison and/or the parison is sucked via vacuum holes formed in the molding surfaces of the split mold, and the parison is given the shape of each portion such as the storage portion and the holding portion.

At this stage, the lids are not formed, and a connected body in which the outlet of each resin container is open is manufactured.

(2) Fill Process

For example, a nozzle is inserted inside the storage portion of each resin container via the outlet, a predetermined amount of the liquid content is injected from the nozzle, and the liquid content is stored in the storage portion.

(3) Seal Process

After the predetermined amount of the liquid content is stored in the storage portion, the lid portion is formed to seal the outlet.

Note that the connected body of the present embodiment can be manufactured using a method other than that described above.

Also, in the present embodiment, the resin container is manufactured in a state forming the connected body. However, it is not necessary to manufacture the resin container in a state forming the connected body.

Furthermore, in the present embodiment, the connected body and the resin containers each have a specific shape. However, the resin container of the present invention is not limited to this example.

For example, in the present embodiment, the resin container has a two layer structure. However, the resin container of the present invention may have a structure of three or more layers further including a separate functional layer (gas permeation prevention layer, steam permeation prevention layer, light transmission prevention layer, or content permeation prevention layer) on the outer side of the second layer.

In this manner, the present invention is not limited to the examples described above in any way.

The resin container according to the present embodiment is configured as described above and thus has the following advantages.

A resin container according to the present embodiment includes a container body made of resin, configured to store liquid content, and including an outlet. The container body includes a body portion configured to store the liquid content; the outlet of the container body has a smaller diameter than the body portion; an inner wall surface of the container body that comes into contact with the liquid content includes a cyclic olefin copolymer; and at least a portion of a flow path of the liquid content upstream of the outlet has a diameter ranging from 0.5 mm to 8.0 mm.

With the resin container according to the present embodiment, liquid collection tends not to occur.

Note that the resin container according to the present invention is not limited to the above-described embodiment. Furthermore, the resin container according to the present invention is not limited by the above-described effects. Various modifications can be made to the resin container according to the present invention without departing from the spirit of the present invention.

EXAMPLES

The present invention will now be described in further detail using Examples, but the present invention is not limited to the Examples.

Resin containers forming a connected body were manufactured as illustrated in FIG. 1, and evaluation relating to liquid collecting at the neck portion was performed.

Note that the raw materials used in these evaluations are as follows.

Test Materials

COC1:

Cyclic olefin copolymer (glass transition temperature of 78° C., density of 1010 $kg/m^3$, melt flow rate of 32 g/10 min (260° C.), trade name "TOPAS 8007S" (available from Polyplastics Co., Ltd.))

COC2:

Cyclic olefin copolymer (glass transition temperature of 80° C., density of 1020 $kg/m^3$, melt flow rate of 30 g/10 min (260° C.), trade name "APEL APL6509T" (available from Mitsui Chemicals, Inc.))

PE-LLD:

Linear low-density polyethylene (density of 920 $kg/m^3$, melt flow rate of 0.95 g/10 min (190° C.))

PE-LD:

Low-density polyethylene (density of 922 $kg/m^3$, melt flow rate of 0.60 g/10 min (190° C.))

Evaluation

A resin container having a two layer structure including a first layer (inner layer) containing a cyclic olefin copolymer and a linear low-density polyethylene at the compounding ratio (%) indicated in Table 1 and a second layer (outer layer) containing a low-density polyethylene was manufactured. Also, a resin container having a two layer structure including a first layer (inner layer) containing a low-density polyethylene and a second layer (outer layer) containing a low-density polyethylene was manufactured.

The resin containers were manufactured using a blow-fill-seal method to form a connected body including the five connected resin containers.

The lid of the resin container was twisted off to form an opening.

A buffer solution (containing 0.6 mass % of sodium hydrogen phosphate and 0.07 mass % of sodium dihydrogen phosphate) was prepared, the resin container was orientated with the opening portion pointing downward and the storage portion was pressed to expel the small amount of air inside, and the opening was brought into contact with the liquid surface of the buffer solution and the pressing force on the storage portion was relaxed to take in the buffer solution through the opening portion.

The pressing force on the storage portion was adjusted so that the amount of buffer solution corresponded to the amount needed to fill the container neck portion.

Next, the container was fixed in position with the opening pointing upward, and the time taken until the liquid surface of the opening decreased to 10% of the neck portion length was measured (time A).

The amount of buffer solution in the neck portion at the time A was measured.

For the resin container of each test example, in a similar manner, the buffer solution was taken in, and the amount of buffer solution in the neck portion after the time A had elapsed from when the container is fixed with the opening portion pointing upward, was measured.

The improvement in liquid residuality in the neck portion was calculated using Equation 1.

Residuality improvement (%)={1−(amount of liquid in neck portion of container of example/amount of liquid in neck portion of container not containing COC)}×100     Equation 1

The container of each test example was measured five times, and the average value of the residuality improvement of each test example was taken as the residuality improvement. The results of evaluation performed according to the following evaluation criteria are listed in the table.

Excellent: Residuality improvement of 30% or greater

Good: Residuality improvement ranging from 20% to less than 30%

Fair: Residuality improvement of less than 20%

TABLE 1

| | | Comparative Example 1-1 | Example 1-1 | Example 2-1 | Example 3-1 | Example 4-1 | Example 5-1 |
|---|---|---|---|---|---|---|---|
| Inner layer | COC1 | — | 60 | 70 | 80 | 90 | 97 |
| | PE-LLD | — | 40 | 30 | 20 | 10 | 3 |
| | PE-LD | 100 | — | — | — | — | — |
| Outer layer | PE-LD | 100 | 100 | 100 | 100 | 100 | 100 |
| Neck portion inner diameter (mm) | | 1.5 | 1.5 | 1.5 | 1.5 | 1.5 | 1.5 |
| Residuality improvement | | — | Good | Good | Excellent | Excellent | Excellent |

| | | Comparative Example 2-1 | Example 6-1 | Example 7-1 | Example 8-1 | Example 9-1 |
|---|---|---|---|---|---|---|
| Inner layer | COC1 | — | 60 | 70 | 80 | 90 |
| | PE-LLD | — | 40 | 30 | 20 | 10 |
| | PE-LD | 100 | — | — | — | — |
| Outer layer | PE-LD | 100 | 100 | 100 | 100 | 100 |
| Neck portion inner diameter (mm) | | 2.0 | 2.0 | 2.0 | 2.0 | 2.0 |
| Residuality improvement | | — | Excellent | Excellent | Excellent | Excellent |

| | | Comparative Example 3-1 | Example 10-1 | Comparative Example 4-1 | Example 11-1 |
|---|---|---|---|---|---|
| Inner layer | COC1 | — | 60 | — | 60 |
| | PE-LLD | — | 40 | — | 40 |
| | PE-LD | 100 | - | 100 | — |
| Outer layer | PE-LD | 100 | 100 | 100 | 100 |
| Neck portion inner diameter (mm) | | 3.5 | 3.5 | 5.0 | 5.0 |
| Residuality improvement | | — | Excellent | — | Excellent |

| | | Comparative Example 1-2 | Example 1-2 | Example 2-2 | Example 3-2 | Example 4-2 | Example 5-2 |
|---|---|---|---|---|---|---|---|
| Inner layer | COC2 | — | 60 | 70 | 80 | 90 | 97 |
| | PE-LLD | — | 40 | 30 | 20 | 10 | 3 |
| | PE-LD | 100 | — | — | — | — | — |
| Outer layer | PE-LD | 100 | 100 | 100 | 100 | 100 | 100 |
| Neck portion inner diameter (mm) | | 1.5 | 1.5 | 1.5 | 1.5 | 1.5 | 1.5 |
| Residuality improvement | | — | Good | Good | Excellent | Excellent | Excellent |

| | | Comparative Example 2-2 | Example 6-2 | Example 7-2 | Example 8-2 | Example 9-2 |
|---|---|---|---|---|---|---|
| Inner layer | COC2 | — | 60 | 70 | 80 | 90 |
| | PE-LLD | — | 40 | 30 | 20 | 10 |
| | PE-LD | 100 | — | — | — | — |

TABLE 1-continued

| | | | | | | |
|---|---|---|---|---|---|---|
| Outer layer | PE-LD | 100 | 100 | 100 | 100 | 100 |
| Neck portion inner diameter (mm) | | 2.0 | 2.0 | 2.0 | 2.0 | 2.0 |
| Residuality improvement | | — | Excellent | Excellent | Excellent | Excellent |

| | | Comparative Example 3-2 | Example 10-2 | Comparative Example 4-2 | Example 11-2 |
|---|---|---|---|---|---|
| Inner layer | COC2 | — | 60 | — | 60 |
| | PE-LLD | — | 40 | — | 40 |
| | PE-LD | 100 | — | 100 | — |
| Outer layer | PE-LD | 100 | 100 | 100 | 100 |
| Neck portion inner diameter (mm) | | 3.5 | 3.5 | 5.0 | 5.0 |
| Residuality improvement | | — | Excellent | — | Excellent |

As can be seen from the foregoing, with the resin container of the present invention, liquid is unlikely to collect in the neck portion.

REFERENCE SIGNS LIST

1 Resin container
10 Container body
11 Storage portion
12 Outlet
14 Holding portion
20 Lid
31, 32 Connecting portion
100 Connected body
L1 First layer
L2 Second layer

The invention claimed is:

1. A resin container, comprising:

a container body made of resin, configured to store liquid content, and including an outlet, wherein the container body includes a body portion configured to store the liquid content, the outlet of the container body has a smaller diameter than the body portion, an inner wall surface of the container body that comes into contact with the liquid content includes a cyclic olefin copolymer and a linear low-density polyethylene resin, at least a portion of a flow path of the liquid content upstream of the outlet has a diameter ranging from 0.5 mm to 8.0 mm, a main monomer of the linear low-density polyethylene resin is an ethylene, a comonomer of the linear low-density polyethylene resin introduces a short chain branch in the molecular structure, and the short chain branch is introduced at a ratio of from 5 to 100 per 1000 units of structural units of the ethylene.

2. The resin container according to claim 1, wherein a proportion of the cyclic olefin copolymer with respect to a resin forming the inner wall surface ranges from 55 mass % to 98 mass %.

3. The resin container according to claim 1, wherein the body portion has an inner lateral cross-sectional area ($S_0$) ranging from 20 $mm^2$ to 300 $mm^2$.

4. The resin container according to claim 3, wherein a ratio ($S_0/S_1$) between the inner lateral cross-sectional area ($S_0$) of the body portion and a lateral cross-sectional area ($S_1$) of the flow path ranges from 1.5 to 60.

5. The resin container according to claim 1, wherein the container body has a volume ranging from 0.1 ml to 10 mL.

6. The resin container according to claim 5, wherein the liquid content is an external use product.

7. A resin container connected body, comprising:

a connected body having a configuration in which a plurality of the container bodies of the resin containers according to claim 1 are connected together, wherein, in the connected body, a plurality of the container bodies are disposed side by side with an opening direction of the outlet facing upward, and the resin containers adjacent to each other are connected via a connecting portion provided on side edge portions of the resin containers, and the connected body is an integrally formed article, and each one of the resin containers is configured to be separated by breaking the connecting portion.

8. The resin container according to claim 1, wherein a glass transition temperature of the inner wall is from 67° C. or higher to 90° C. or lower.

* * * * *